W. H. HENKEL.
WAGON-LOCK.
No. 176,630. Patented April 25, 1876.
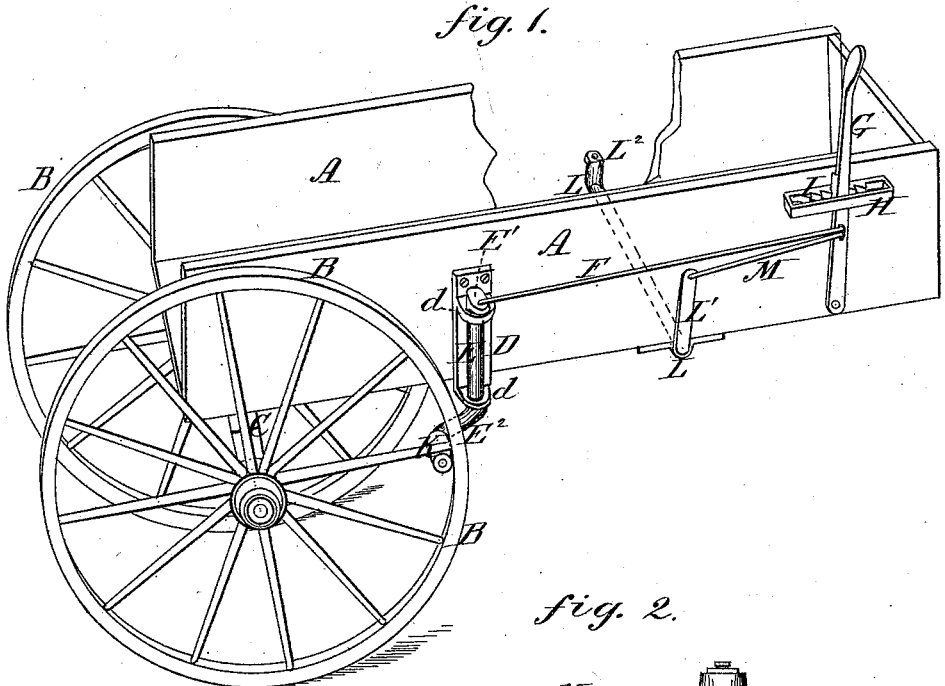
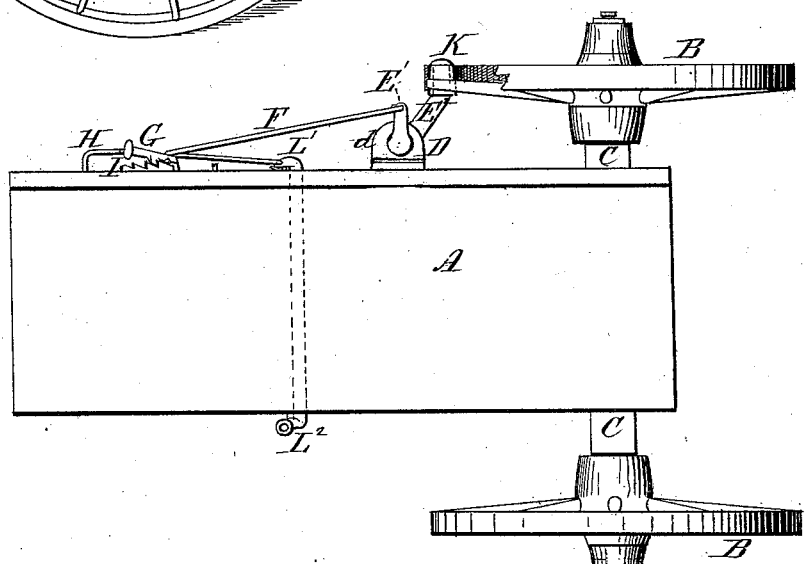
Witnesses:
Inventor:
Wm. H. Henkel,
by Johnson and Johnson
Att'ys.

UNITED STATES PATENT OFFICE

WILLIAM H. HENKEL, OF MORTON, INDIANA.

IMPROVEMENT IN WAGON-LOCKS.

Specification forming part of Letters Patent No. 176,630, dated April 25, 1876; application filed March 2, 1876.

*To all whom it may concern:*

Be it known that I, WILLIAM H. HENKEL, of Morton, in the county of Putnam and State of Indiana, have invented a new and useful Improvement in Wagon-Locks, of which the following is a specification:

My improvement relates to devices for locking or braking the wheels of a wagon or other conveyance, and to mechanism for operating the same at will, to throw it into and out of engagement; and it consists in the construction, combination, and arrangement of certain mechanism, hereinafter more fully explained, reference being had to the accompanying drawing, in which the figure represented is a perspective view of so much of a wagon having my improved brake attached as is necessary to the understanding of my invention, a top view being also shown.

A is the bed of the wagon; B B', the hind wheels on the axle C. At each side of the bed A, on the outside thereof, and at a point nearly or quite in line with the fellies of the wheels B B', I secure a stout bracket or stirrup, D, cast in one or more pieces of iron, or otherwise formed of other suitable material, and strengthened by a portion thereof projecting beneath and secured to the bed A. This bracket D has formed upon it two stout perforated lugs, $d$ $d$, one above the other, which serve as journal-bearings for an upright rock-shaft, E. This shaft is provided with an arm, $E^1$, at its upper end, and is operated, through the connection or link F, from a hand-lever, G, pivoted at the right hand and near the forward end of the wagon, in easy reach of the driver's hand. A guide, H, protects the lever, keeping it in place and limiting its movement, and a rack, I, secured upon the side of the bed, fixes the lever, which has an angular edge catching into the rack at any desired point of adjustment. The lower end of shaft E is also formed into an arm, $E^2$. If I place the bracket D a little forward of the circumference of the wheel I bend this arm $E^2$ a little in a horizontal plane. The arm is sufficiently long to project clear under the felly, and carries an anti-friction roll, K, made convex in form, and smallest in diameter at its outer end. When the brake is thrown into engagement with the wheel the roll K may strike a spoke or a portion of the felly, along which it must move until it reaches the angle formed by the felly and one of the spokes; the wheel so locked will then cease to revolve. The convexity and tapering form of the roll K, at its outer end, is for the purpose of allowing it to slip past a descending spoke, which it may encounter, without engaging in the outward or braking movement of lever-arm $E^2$. It will thus act as an anti-friction roller at whatever point on the wheel it touches, obviating friction and wear.

For the purpose of operating a brake on the opposite side from the same lever I secure beneath the bed, and transversely thereto and in bearings which allow free play, a rocking bar or shaft, L, provided with upwardly-projecting arms $L^1$ $L^2$. The arm $L^1$ is connected with the lever G by a link, M, which may be detached when it is desired to operate only one brake. The arm $L^2$, at the other end, is connected by link with a brake (not shown) corresponding in character, position, and relation with the brake D E $E^1$ $E^2$.

A block or other suitable device may be placed on the side of the wagon-bed, for preventing the arm $E^1$ from passing to the dead-point or beyond.

I am aware that fingers, carried by a head-plate, and arranged to slide horizontally from the vehicle-body to project said fingers between the wheel-spokes, is not new, and that such sliding fingers have been operated by a lever, to which they are connected in pairs for locking all four of the wheels. My invention, however, differs essentially from such wheel-lock in that it combines, with a vertical oscillating shaft, a crank or brake arm, which is moved in the arc of a circle to perform its functions.

I claim—

1. The combination of a rock-shaft, E, having brake arm or crank $E^2$, with wheel B, substantially as and for the purpose set forth.

2. The combination, with the rock-shaft E and wheel, of an anti-friction roll, K, on the brake arm or crank of said rock-shaft, substantially as and for the purpose set forth.

3. The combination, with the rock-shaft E and wheel B, of an anti-friction roll, K, on the brake arm or crank of said rock-shaft, said roll being made tapering at its outer end, substantially as and for the purpose set forth.

4. The combination of rock-shaft E, having brake arm or crank $E^2$, with a link, lever, and rack for engaging and disengaging the same, and retaining it in either position, substantially as set forth.

5. The combination of hand-lever, detachable link, and rock-shaft L, arranged beneath the wagon-bed and transversely thereto, and having upwardly projecting arms $L^1$ $L^2$, with the rock-shaft E and its brake or crank arm $E^2$, substantially as and for the purpose set forth.

In testimony whereof I have affixed my signature in the presence of two witnesses.

WILLIAM H. HENKEL.

Witnesses:
   JACOB McGAUGHEY,
   ANDY McGAUGHEY.